(12) United States Patent
Ito et al.

(10) Patent No.: US 9,796,293 B2
(45) Date of Patent: Oct. 24, 2017

(54) VEHICLE POWER DEVICE

(71) Applicant: HONDA MOTOR CO., LTD., Tokyo (JP)

(72) Inventors: Satoko Ito, Wako (JP); Daijiro Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/140,479

(22) Filed: Apr. 28, 2016

(65) Prior Publication Data

US 2016/0355100 A1  Dec. 8, 2016

(30) Foreign Application Priority Data

Jun. 4, 2015 (JP) ................................. 2015-113854
Jul. 23, 2015 (JP) ................................. 2015-146126

(51) Int. Cl.
*B60K 1/04* (2006.01)
*B60L 11/18* (2006.01)
(Continued)

(52) U.S. Cl.
CPC ............ *B60L 11/1877* (2013.01); *B60K 1/04* (2013.01); *B60L 11/1874* (2013.01);
(Continued)

(58) Field of Classification Search
CPC .......... B60K 2001/003; B60L 11/1874; B60L 11/1892
(Continued)

(56) References Cited

U.S. PATENT DOCUMENTS 5,624,003 A * 4/1997 Matsuki ............. B60H 1/00278
180/65.1
5,678,760 A * 10/1997 Muso ..................... B60K 11/02
165/41
(Continued)

FOREIGN PATENT DOCUMENTS

JP        05-032069 U      4/1993
JP        2011-006051      1/2011
(Continued)

OTHER PUBLICATIONS

Japanese Office Action for corresponding JP Application No. 2015-146126, dated May 16, 2017 (w/ English machine translation).

*Primary Examiner* — Jeffrey J Restifo
(74) *Attorney, Agent, or Firm* — Mori & Ward, LLP (57) ABSTRACT

A vehicle power device includes a front battery module, a rear battery module, a battery case, and a cooling circuit. The cooling circuit includes a cooling pump, a front battery module cooler, a rear battery module cooler, and cooling internal piping. The battery case houses the front and rear battery modules and the cooling internal piping. Coolant from the cooling pump flows to outside of the battery case via the cooling internal piping. The cooling internal piping includes a branched section and a flow path. The branched section is provided between the front battery module and the rear battery module to branch the flow of the coolant to the front battery module cooler and to the rear battery module cooler. The flow path has one end connected to the branched section and another end passing through to outside of the battery case.

19 Claims, 8 Drawing Sheets

(51) Int. Cl.
  *H01M 10/613* (2014.01)
  *H01M 10/625* (2014.01)
  *H01M 2/10* (2006.01)
  *H01M 10/6556* (2014.01)
  *H01M 10/6568* (2014.01)
  *B60K 1/00* (2006.01)

(52) U.S. Cl.
  CPC ....... *H01M 2/1077* (2013.01); *H01M 2/1083* (2013.01); *H01M 10/613* (2015.04); *H01M 10/625* (2015.04); *H01M 10/6556* (2015.04); *H01M 10/6568* (2015.04); *B60K 2001/005* (2013.01); *B60K 2001/0438* (2013.01)

(58) Field of Classification Search
  USPC .............................................. 180/68.4, 68.5
  See application file for complete search history.

(56) References Cited

U.S. PATENT DOCUMENTS

| | | | | |
|---|---|---|---|---|
| 6,106,972 A * | 8/2000 | Kokubo | ............. | H01M 2/1083 429/120 |
| 6,394,210 B2 * | 5/2002 | Matsuda | ............. | B60H 1/00278 180/65.1 |
| 6,512,347 B1 * | 1/2003 | Hellmann | ........... | H01M 10/625 320/107 |
| 7,389,840 B2 * | 6/2008 | Makuta | ................. | B62K 19/30 180/65.1 |
| 7,823,671 B2 * | 11/2010 | Inoue | .................... | B60K 11/02 180/68.1 |
| 8,215,432 B2 * | 7/2012 | Nemesh | ............. | B60H 1/00278 180/68.1 |
| 8,919,471 B2 * | 12/2014 | Oberti | ...................... | B60K 1/00 180/68.4 |
| 2002/0053216 A1 * | 5/2002 | Ap | .......................... | B60K 1/04 62/323.1 |
| 2002/0073726 A1 * | 6/2002 | Hasebe | .................... | B60K 1/02 62/323.1 |
| 2005/0224265 A1 * | 10/2005 | Mizuno | .................... | B60K 1/02 429/413 |
| 2006/0102398 A1 * | 5/2006 | Mizuno | .................... | B60K 1/02 429/430 |
| 2006/0113129 A1 * | 6/2006 | Tabata | ................... | B60K 6/365 180/65.25 |
| 2006/0174643 A1 * | 8/2006 | Ostrom | .................... | F28D 15/00 62/259.2 |
| 2009/0008167 A1 * | 1/2009 | Aoyagi | .............. | B60H 1/00392 180/65.31 |
| 2009/0183936 A1 * | 7/2009 | Kim | ........................ | B60K 1/04 180/68.4 |
| 2011/0233996 A1 * | 9/2011 | Kato | .................... | B60L 11/1887 307/9.1 |
| 2012/0015257 A1 * | 1/2012 | Arisawa | ................... | B60K 1/04 429/400 |
| 2012/0021301 A1 * | 1/2012 | Ohashi | ..................... | B60K 1/04 429/400 |
| 2013/0056194 A1 * | 3/2013 | Cregut | ................... | B60K 11/02 165/300 |
| 2014/0339009 A1 * | 11/2014 | Suzuki | ..................... | B60K 1/00 180/232 |
| 2015/0079433 A1 * | 3/2015 | Tamai | .................. | H01M 10/48 429/62 |
| 2015/0295285 A1 * | 10/2015 | Takeuchi | .................. | F25B 5/00 62/498 |
| 2016/0355100 A1 * | 12/2016 | Ito | ....................... | B60L 11/1877 |

FOREIGN PATENT DOCUMENTS

| | | |
|---|---|---|
| JP | 2012-156010 | 8/2012 |
| JP | 2013-016351 | 1/2013 |
| JP | 2013-173389 | 9/2013 |
| JP | 2014-192044 | 10/2014 |

* cited by examiner

VEHICLE POWER DEVICE

CROSS-REFERENCE TO RELATED APPLICATIONS

The present application claims priority under 35 U.S.C. §119 to Japanese Patent Application No. 2015-113854, filed Jun. 4, 2015, entitled "Vehicle power unit", and Japanese Patent Application No. 2015-146126, filed Jul. 23, 2015, entitled "Vehicle power unit." The contents of these applications are incorporated herein by reference in their entirety.

BACKGROUND

1. Field

The present invention relates to a vehicle power device.

2. Description of the Related Art

Vehicle power units having plural battery modules housed in a battery case have been known. For example, in the vehicle power unit described in Japanese Unexamined Patent Application Publication No. 2013-173389, two or three battery modules (battery packs) are disposed in front and in the rear, each battery module including plural batteries (battery cells) housed in a battery case.

In the vehicle power unit described in Japanese Unexamined Patent Application Publication No. 2013-173389, a branched section between a cooling pipe supplying cooling water to the front battery module and a cooling pipe supplying cooling water to the rear battery module is positioned further forward than the front battery module.

SUMMARY

According to one aspect of the present invention, a vehicle power device includes a front battery module, a rear battery module, a battery case, and a cooling circuit. The front battery module includes a plurality of batteries. The rear battery module includes a plurality of batteries. The battery case houses the front battery module and the rear battery module. The cooling circuit includes a cooling pump, a front battery module cooler that cools the front battery module, and a rear battery module cooler that cools the rear battery module. The battery case is disposed below a floor panel. The cooling circuit includes cooling internal piping that is provided inside the battery case, that receives coolant from the cooling pump, and that discharges coolant to outside of the battery case. The cooling internal piping includes, between the front battery module and the rear battery module, a branched section where the flow of coolant branches to the front battery module cooler and to the rear battery module cooler and includes a flow path having one end connected to the branched section and another end passing through to outside the battery case through one side of the battery case in a vehicle width direction.

According to another aspect of the present invention, a vehicle power device includes a front battery module, a rear battery module, a battery case, and a cooling circuit. The front battery module includes a plurality of first batteries. The rear battery module includes a plurality of second batteries. The rear battery module is arranged at rear of the front battery module in a front-rear direction of a vehicle. The battery case houses the front battery module and the rear battery module. The cooling circuit includes a cooling pump, a front battery module cooler, a rear battery module cooler, and cooling internal piping. The front battery module cooler is provided at the front battery module to cool the front battery module. The rear battery module cooler is provided at the rear battery module to cool the rear battery module. The cooling internal piping is provided inside the battery case. Coolant from the cooling pump flows to outside of the battery case via the cooling internal piping. The cooling internal piping includes a branched section and a flow path. The branched section is provided between the front battery module and the rear battery module to branch the flow of the coolant to the front battery module cooler and to the rear battery module cooler. The flow path has one end connected to the branched section and another end passing through to outside of the battery case through one side of the battery case in a vehicle width direction substantially orthogonal to the front-rear direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a schematic block diagram of a cooling circuit illustrating coolant flow when a solenoid valve is ON.

DESCRIPTION OF THE EMBODIMENTS

The embodiments will now be described with reference to the accompanying drawings, wherein like reference numerals designate corresponding or identical elements throughout the various drawings.

Explanation follows regarding an embodiment of a vehicle power unit of the present application, with reference to the appended drawings. The drawings should be viewed in the orientation of the reference numerals.

Vehicle Power Unit

Figure 1:
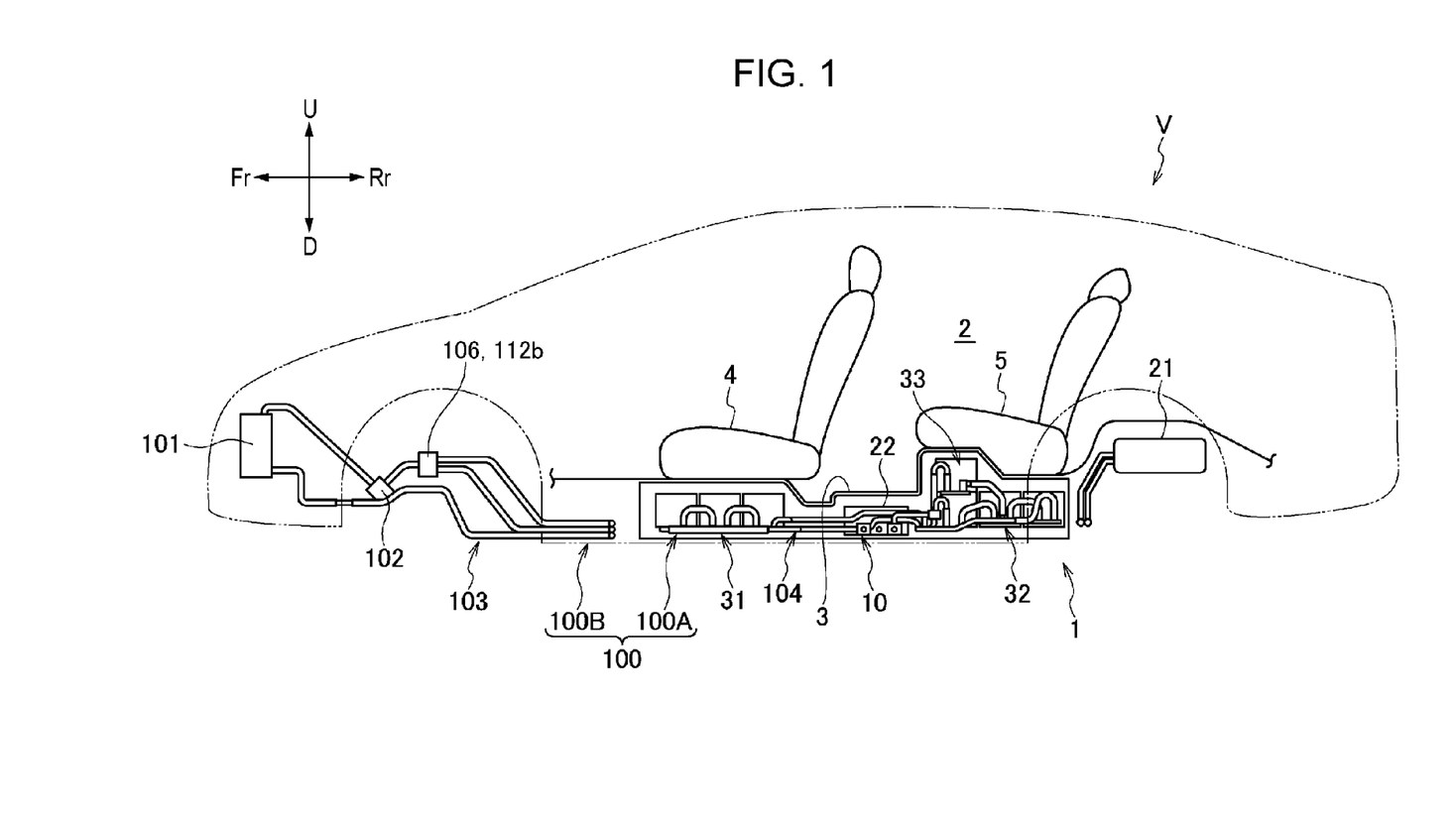
FIG. 1 is a schematic side view of a vehicle installed with a vehicle power unit according to an embodiment of the present application.

As illustrated in FIG. 1, a vehicle power unit 1 according to the embodiment of the present application includes, as principal components, battery modules 31 to 33, a DC/DC converter 22, a charger 21, and a cooling circuit 100 that cools these components. The vehicle power unit 1 is installed in a vehicle V such as a hybrid vehicle, electric vehicle, or fuel cell vehicle. The plural battery modules 31 to 33, the DC/DC converter 22, and part of the cooling circuit 100 are formed into a unit to configure a battery unit 10, and are disposed below a floor panel 3 forming the floor of a vehicle cabin 2. A radiator 101 and a cooling pump 102 configuring the cooling circuit 100 are disposed in a front section of the vehicle V and the charger 21 for charging the battery modules 31 to 33 with power supplied from an external power source is disposed in a rear section of the vehicle V, with the battery unit 10 disposed in between. The cooling circuit 100 includes an internal cooling circuit 100A disposed inside the battery unit 10 and an external cooling circuit disposed outside the battery unit 10.

Battery Unit

Figure 2:
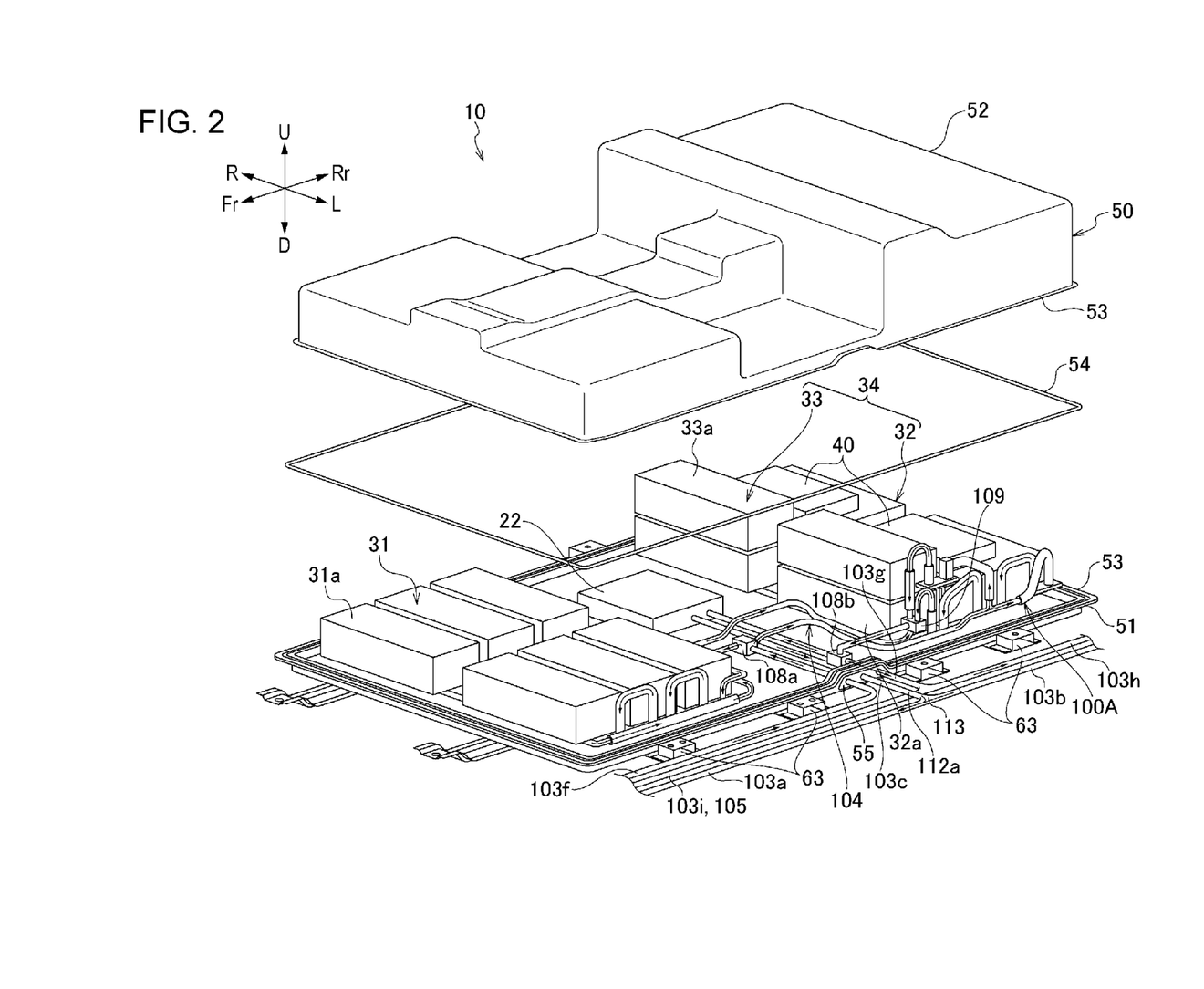
FIG. 2 is an exploded perspective view illustrating a battery unit of a vehicle power unit according to an embodiment of the present application.
Figure 3:
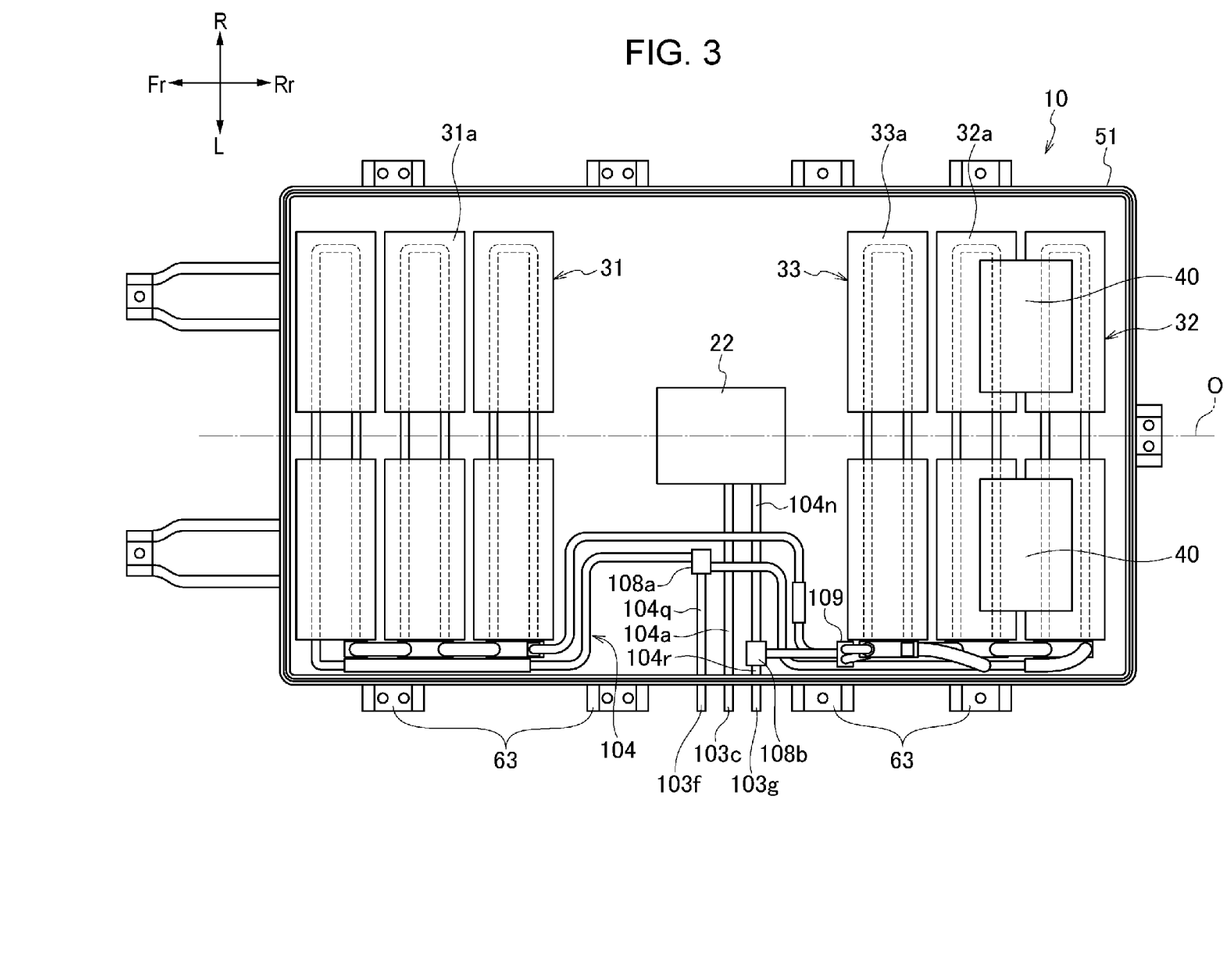
FIG. 3 is a plan view of the inside of the battery unit of FIG. 2.

As illustrated in FIG. 2 and FIG. 3, the battery unit 10 includes the plural battery modules 31 to 33, the DC/DC converter 22, battery ECUs 40, the internal cooling circuit 100A, and a battery case 50 for housing those components.

The battery case 50 is configured by including a bottom plate 51, mounted with the plural battery modules 31 to 33, the DC/DC converter 22, the battery ECUs 40, and the internal cooling circuit 100A, and a cover 52 covering above these components. A mating portion 53 between the bottom plate 51 and the cover 52 is sealed by using a substantially ring shaped seal member 54.

Figure 5:
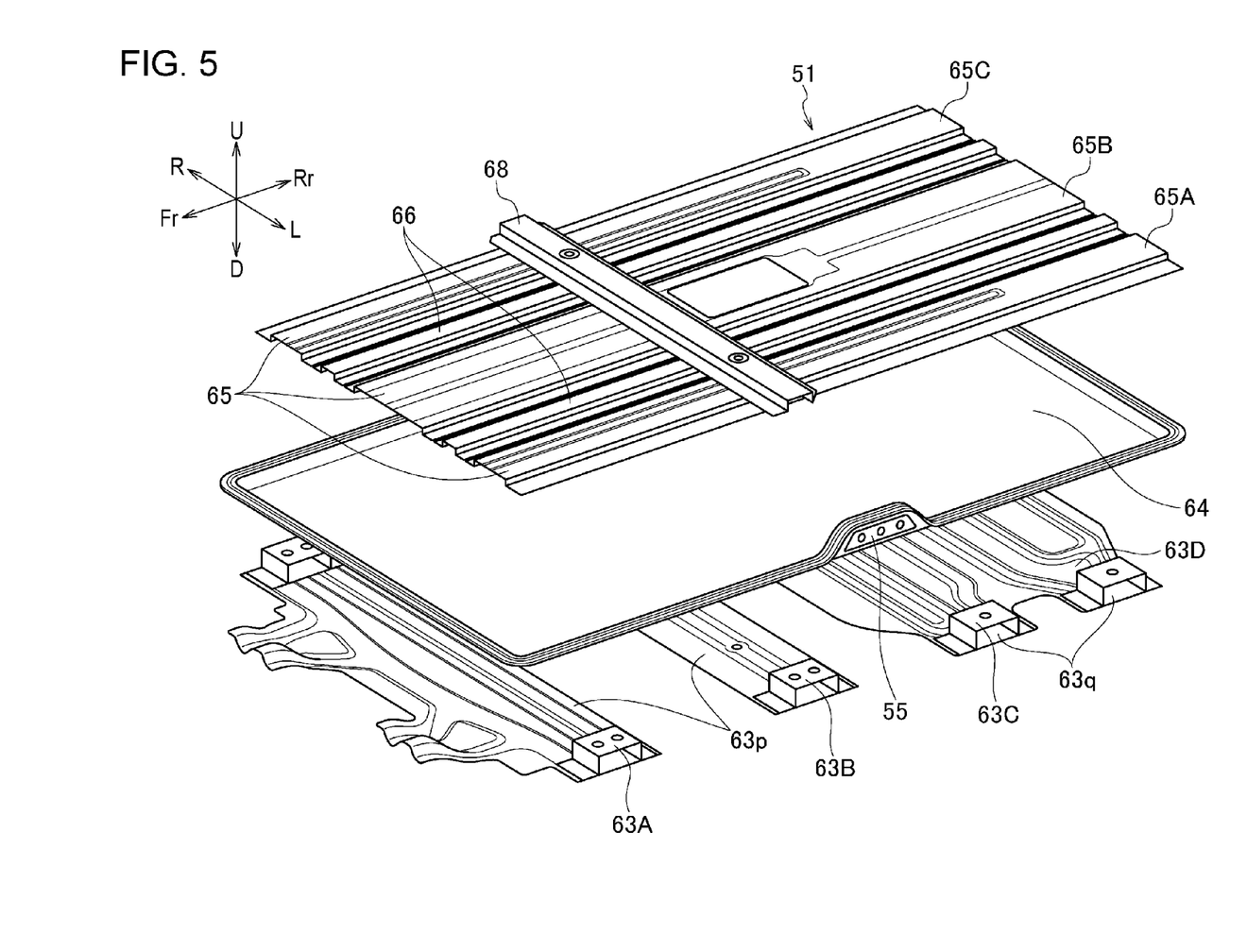
FIG. 5 is an exploded perspective view illustrating a bottom plate of the battery unit of FIG. 2.
Figure 6:
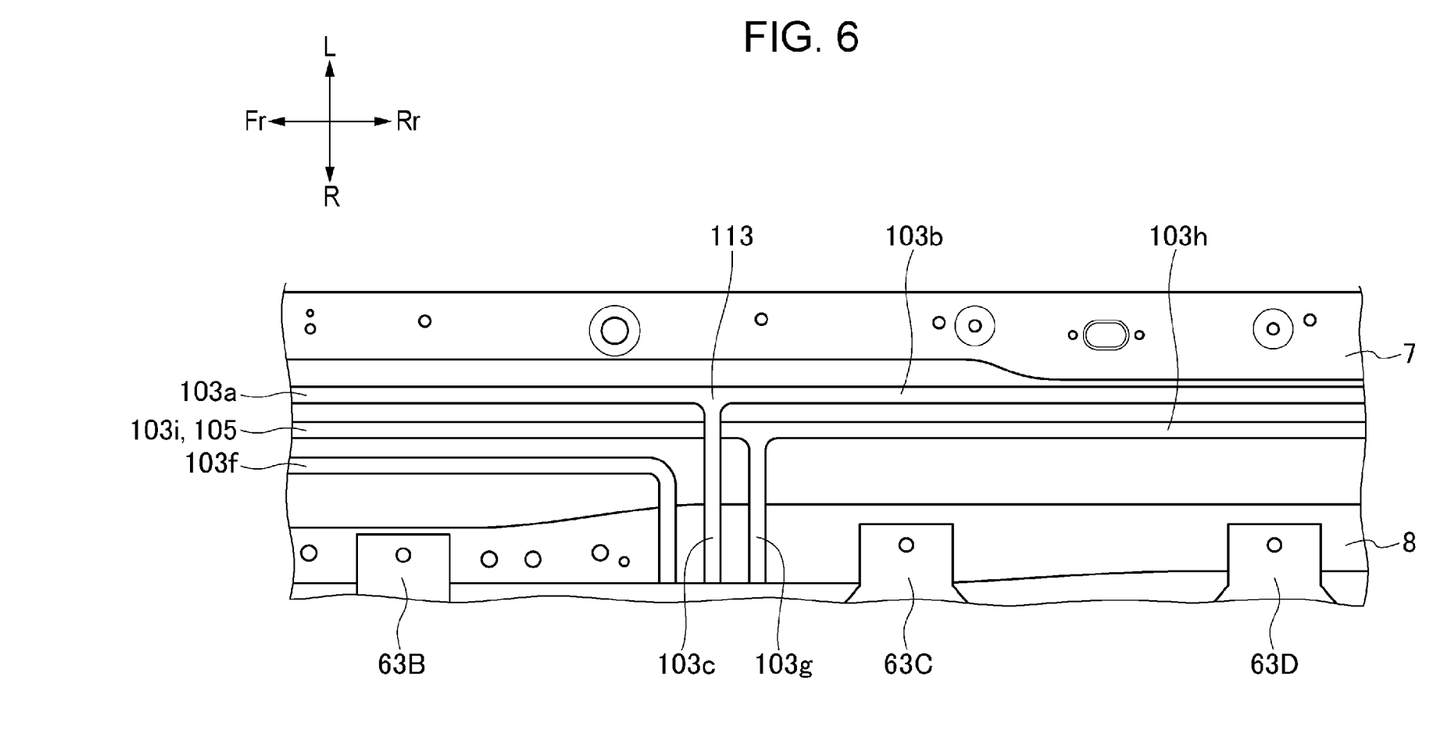
FIG. 6 is a bottom view of part of a vehicle installed with a vehicle power unit according to an embodiment of the present application.

The bottom plate 51 is, as illustrated in FIG. 5, configured by including principal components of a tray 64 disposed below the battery modules 31 to 33, plural longitudinal reinforcement members 65 (65A to 65C) that are fixed to an upper face of the tray 64 and extend along the front-rear direction of the vehicle V, and plural brackets 63 that are fixed to a lower face of the tray 64 and extend along a width direction of the vehicle V. The plural brackets 63 as cross-direction reinforcement members reinforce the tray 64 and are, as illustrated in FIG. 6, fastened to a floor frame 8 alongside and inside a side seal 7 that is disposed at both sides in the width direction of the vehicle V. The battery unit 10 is thereby attached so as to be suspended between the side floor frames 8 on either side, and below the floor panel 3.

The brackets 63 each include a bracket body 63p extending in the left-right direction below the tray 64 and fixed to the tray 64 by spot welding or the like, and bracket fastening portions 63q provided at both the left and right ends of the bracket body 63p so as to be exposed at the left and right of the tray 64. A total of four of the brackets 63 are provided, these being, in sequence from the front, a first bracket 63A, a second bracket 63B, a third bracket 63C, and a fourth bracket 63D. The bracket fastening portions 63q of the first bracket 63A to the fourth bracket 63D are disposed at substantially equal intervals along the front-rear direction, so as to retain the tray 64 in a balanced manner.

The thus disposed brackets 63 and longitudinal reinforcement members 65 together form a lattice shape with the tray 64 interposed therebetween, thereby securing the rigidity of the bottom plate 51. Auxiliary longitudinal reinforcement members 66 and a cross member 68 are provided above the tray 64 to further increase rigidity.

The plural battery modules 31 to 33 are composed of the front battery module 31 housed in the front section of the battery case 50, and a rear battery module 34 housed in a rear section of the battery case 50. The rear battery module 34 is composed of the lower rear battery module 32 and the upper rear battery module 33. Each of the battery modules 31 to 33 includes plural high voltage batteries 31a to 33a. In the present embodiment, the front battery module 31 is composed of a total of six high voltage batteries 31a, arranged in two rows in the left-right direction about a center line O in vehicle width direction and three rows in the front-rear direction. The lower rear battery module 32 is similarly composed of a total of six high voltage batteries 32a, arranged in two rows in the left-right direction and three rows in the front-rear direction, and the upper rear battery module 33 is composed of two high voltage batteries 33a, arranged side-by-side in the left-right direction.

Returning to FIG. 1, the plural battery modules 31 to 33 are disposed below front section seats 4 and rear section seats 5 of the vehicle V. More specifically, the front battery module 31 is disposed below the front section seats 4, and the rear battery module 34 is disposed below the rear section seats 5.

The front battery module 31 is disposed flat without being stacked when the front section battery module 31 is disposed below the front section seats 4. The rear battery module 34 is disposed above and below at the front of the seating plane of the rear section seats 5 when disposed below the rear section seats 5. More specifically, the two high voltage batteries 33a configuring the upper rear battery module 33 are disposed above the two high voltage batteries 32a in the row farthest to the front from out of the six total of six high voltage batteries 32a configuring the lower rear battery module 32.

The DC/DC converter 22 is a high voltage device that transforms the voltage of direct current, and is disposed between the front battery module 31 and the rear battery module 34, and at the center in the width direction of the battery unit 10. The battery ECUs 40 are battery controllers employed to control charging/discharging and temperature of the high voltage batteries 31a to 33a, and are disposed to the rear of the upper rear battery module 33, and above the lower rear battery module 32.

The DC/DC converter 22 and the charger 21 have high heat resistance compared to the high voltage batteries 31a to 33a, and are set with a higher control temperature. For example, when the upper temperature limit of the high voltage batteries 31a to 33a is 60° C., the upper temperature limit of the DC/DC converter 22 and the charger 21 is set to 80° C., and in a high temperature environment the high voltage batteries 31a to 33a need to be prioritized for cooling. However, due to the high temperature reached by the charger 21 during charging or the like, sometimes a situation occurs in which it is desirable to cool the DC/DC converter 22 and the charger 21, with there being no need to cool the high voltage batteries 31a to 33a.

Explanation follows regarding the internal cooling circuit 100A, together with the external cooling circuit 100B.

Cooling Circuit Configuration

Figure 4:
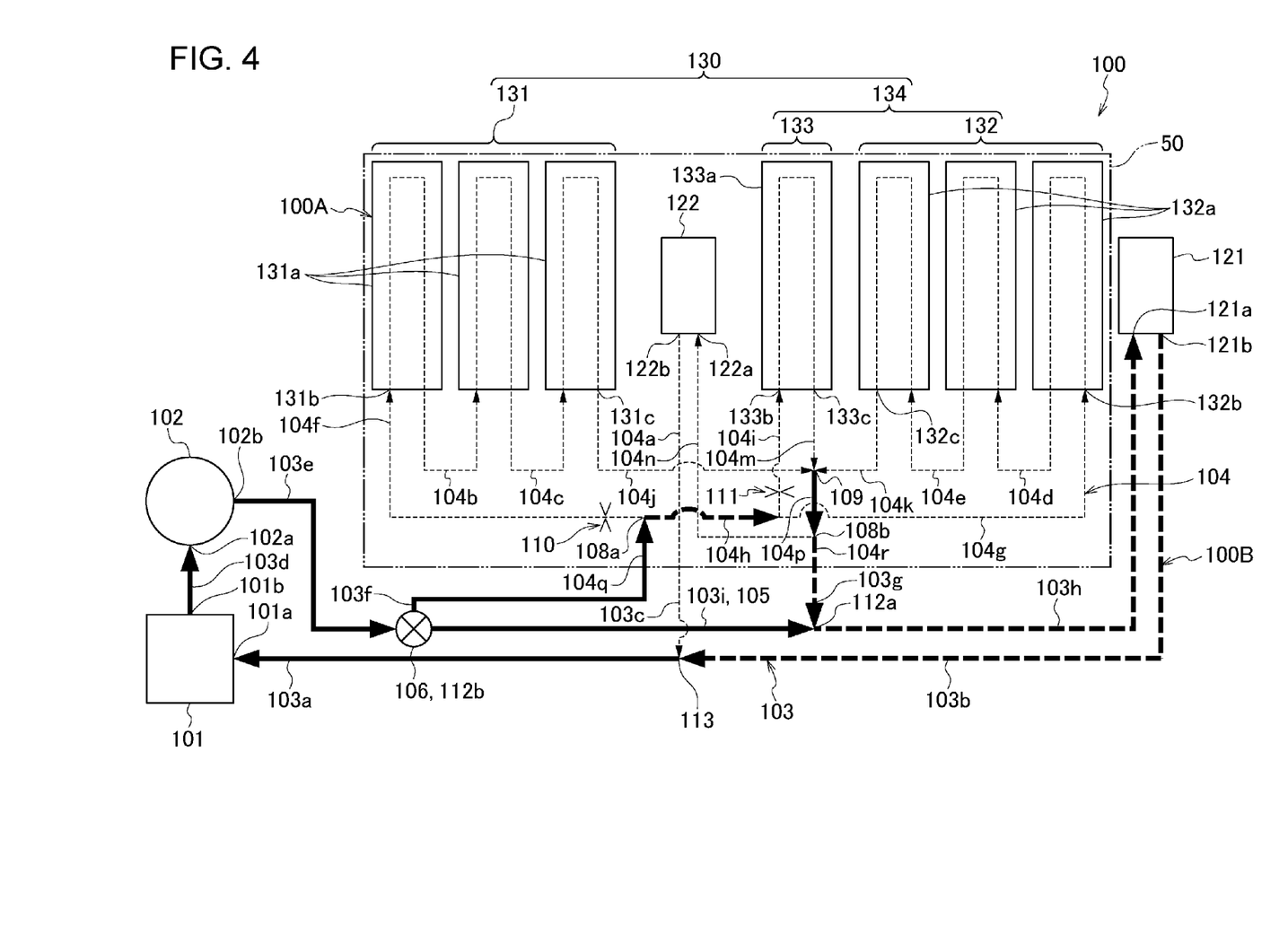
FIG. 4 is a circuit diagram illustrating a configuration of a cooling circuit of a vehicle power unit according to an embodiment of the present application.

As illustrated in FIG. 4, in the cooling circuit 100, the radiator 101, the cooling pump 102, a high voltage battery cooler 130, a DC/DC converter cooler 122, and a charger cooler 121 together form a coolant circulation path, connected by external piping 103 laid out outside the battery case 50, and internal piping 104 laid out inside the battery case 50.

The radiator 101 dissipates heat of the coolant flowing in through an inflow port 101a, and discharges the coolant cooled by heat dissipation through a discharge port 101b. The inflow port 101a of the radiator 101 is connected to a discharge port 121b of the charger cooler 121 through a first external pipe 103a and a second external pipe 103b, and is also connected to a discharge port 122b of the DC/DC converter cooler 122 through the first external pipe 103a, a third external pipe 103c, and a first internal pipe 104a. The discharge port 101b of the radiator 101 is connected to a suction port 102a of the cooling pump 102 through a fourth external pipe 103d.

The cooling pump 102 ejects, from a discharge port 102b, coolant that has been sucked in through the suction port 102a under driving of an electrical motor (not illustrated in the drawings). The discharge port 102b of the cooling pump 102 is connected, through a fifth external pipe 103e, a sixth external pipe 103f, and a fifteenth internal pipe 104q, to a first in-case branched section 108a, this being an inflow port of the high voltage battery cooler 130.

The high voltage battery cooler 130 includes plural battery module coolers 131 to 133 that cool the plural battery modules 31 to 33. The front battery module cooler 131 that cools the front battery module 31 is composed of three cooling jackets 131a arranged in a row along the front-rear direction to cool respective pairs of high voltage batteries 31a, which are arranged side-by-side on the left and right. The three cooling jackets 131a are connected together in series through a second internal pipe 104b, and a third internal pipe 104c. The lower rear battery module cooler 132 that cools the lower rear battery module 32 is composed of three cooling jackets 132a arranged in a row along the front-rear direction to cool respective pairs of high voltage batteries 32a, which are arranged side-by-side on the left and right. The three cooling jackets 132a are connected together in series through a fourth internal pipe 104d, and a fifth internal pipe 104e. The upper rear battery module cooler 133 that cools the upper rear battery module 33 is composed of a single cooling jacket 133a that cools the two high voltage batteries 33a arranged as a pair side-by-side on the left and right. In the present specification, a combination of the lower rear battery module cooler 132 and the upper rear battery module cooler 133 is sometimes referred to as a rear battery module cooler 134.

In the high voltage battery cooler 130, the plural battery module coolers 131 to 133 are disposed in a row. More specifically, an inflow port 131b of the front battery module cooler 131 is connected to the first in-case branched section 108a through a sixth internal pipe 104f. An inflow port 132b of the lower rear battery module cooler 132 is connected to the first in-case branched section 108a through a seventh internal pipe 104g and an eighth internal pipe 104h. An inflow port 133b of the upper rear battery module cooler 133 is connected to the first in-case branched section 108a through a ninth internal pipe 104i and the eighth internal pipe 104h. A discharge port 131c of the front battery module cooler 131 is connected to an in-case flow-merging section 109 through a tenth internal pipe 104j, a discharge port 132c of the lower rear battery module cooler 132 is connected to the in-case flow-merging section 109 through an eleventh internal pipe 104k, and a discharge port 133c of the upper rear battery module cooler 133 is connected to the in-case flow-merging section 109 through a twelfth internal pipe 104m.

In the battery unit 10, when the plural battery module coolers 131 to 133 are arranged side-by-side in a row, the first in-case branched section 108a provided at the upstream side of the plural battery module coolers 131 to 133, and the in-case flow-merging section 109 provided at the downstream side of the battery module coolers 131 to 133, are both provided inside the battery case 50.

In the high voltage battery cooler 130, when the plural battery module coolers 131 to 133 are arranged side-by-side in a row, orifices 110 and 111 are respectively provided, as flow rate controllers, at the upstream side (or the downstream side) of the battery module coolers 131 to 133 that cool the battery modules 31 to 33 of smaller battery capacity from out of the plural battery modules 31 to 33, and at the downstream side of the first in-case branched section 108a.

For example, the front battery module 31 has a smaller battery capacity than the total battery capacity of the lower rear battery module 32 and the upper rear battery module 33 together. The orifice 110 is accordingly provided, as a flow rate controller, on the upstream side of the front battery module cooler 131 that cools the front battery module 31 (provided to the sixth internal pipe 104f). Moreover, the upper rear battery module 33 has a smaller battery capacity than the lower rear battery module 32. The orifice 111 is accordingly provided, as a flow rate controller, on the upstream side of the upper rear battery module cooler 133 that cools the upper rear battery module 33 (provided to the ninth internal pipe 104i).

The DC/DC converter cooler 122 is a cooling jacket provided in the DC/DC converter 22, or a cooling jacket disposed adjacent to the DC/DC converter 22. The charger cooler 121 is a cooling jacket provided in the charger 21, or a cooling jacket disposed adjacent to the charger 21. The DC/DC converter cooler 122 and the charger cooler 121 are connected together in parallel to each other, and are disposed at the downstream side of the high voltage battery cooler 130.

More specifically, an inflow port 122a of the DC/DC converter cooler 122 is connected to a second in-case branched section 108b through a thirteenth internal pipe 104n, and an inflow port 121a of the charger cooler 121 is connected to the second in-case branched section 108b through an eighth external pipe 103h, a seventh external pipe 103g, and a sixteenth internal pipe 104r. The discharge port 122b of the DC/DC converter cooler 122 is connected to an outside-case flow-merging section 113 through the first internal pipe 104a and the third external pipe 103c. The discharge port 121b of the charger cooler 121 is connected to the outside-case flow-merging section 113 through the second external pipe 103b. The second in-case branched section 108b is connected to the in-case flow-merging section 109 of the high voltage battery cooler 130 through a fourteenth internal pipe 104p. The outside-case flow-merging section 113 is connected to the inflow port 101a of the radiator 101 through the first external pipe 103a.

In the cooling circuit 100, a bypass flow path 105 is provided connecting the upstream side of the high voltage battery cooler 130, to the upstream side of a high voltage device cooler 120 (the DC/DC converter cooler 122 and the charger cooler 121), and to the downstream side of the high voltage battery cooler 130. More specifically, a connection portion of the fifth external pipe 103e and the sixth external pipe 103f serves as a second outside-case branched section 112b, connecting the second outside-case branched section 112b to a first outside-case branched section 112a of the high voltage device cooler 120 through a ninth external pipe 103i configuring the bypass flow path 105. A three-way solenoid valve 106 is provided to the second outside-case branched section 112b.

When the three-way solenoid valve 106 is OFF, the fifth external pipe 103e and the sixth external pipe 103f are connected together and the coolant ejected from the cooling pump 102 is supplied to the high voltage battery cooler 130. The fifth external pipe 103e and the bypass flow path 105 (the ninth external pipe 103i) are shut off from each other, and coolant supply to the DC/DC converter cooler 122 and the charger cooler 121 through the bypass flow path 105 (the ninth external pipe 103i) is shut off. However, when the three-way solenoid valve 106 is ON, the fifth external pipe 103e and the bypass flow path 105 (the ninth external pipe 103i) are connected together, and the coolant ejected from the cooling pump 102 is supplied to the DC/DC converter cooler 122 and the charger cooler 121, through the bypass flow path 105 (the ninth external pipe 103i). The fifth external pipe 103e and the sixth external pipe 103f are shut off from each other, and supply of coolant to the high voltage battery cooler 130 is shut off. The arrows in FIG. 4 indicate coolant flow directions, and it is never the case that the sixth external pipe 103*f* and the bypass flow path 105 (the ninth external pipe 103*i*) are both connected to the fifth external pipe 103*e*.

In the cooling circuit 100 configured as described above, as illustrated in FIG. 2 and FIG. 3, the first in-case branched section 108*a* is provided in the front-rear direction between the front battery module 31 and the rear battery module 34, dividing the flow of coolant to the front battery module cooler 131 and to the rear battery module cooler 134. There are also four internal pipes extending in the vehicle width direction. The first of these is the fifteenth internal pipe 104*q* with a right end connected to the first in-case branched section 108*a*, the second is the sixteenth internal pipe 104*r* with a right end connected to the second in-case branched section 108*b*, the third is the thirteenth internal pipe 104*n* with a right end connected to the DC/DC converter 22 and a left end connected to the second in-case branched section 108*b*, and the fourth is the first internal pipe 104*a* with a right end connected to the DC/DC converter 22.

The sixteenth internal pipe 104*r* and the thirteenth internal pipe 104*n* that are both connected to the second in-case branched section 108*b* are disposed on a single straight line running along the vehicle width direction. The sixteenth internal pipe 104*r* (the thirteenth internal pipe 104*n*), the first internal pipe 104*a*, and the fifteenth internal pipe 104*q* are disposed adjacent to each other in this sequence from the rear to the front of the vehicle V.

The left end of the sixteenth internal pipe 104*r*, the left end of the first internal pipe 104*a*, and the left end of the fifteenth internal pipe 104*q* each pass through to outside the battery case 50 through the left side of the battery case 50 in the vehicle width direction. More specifically, the left end of the sixteenth internal pipe 104*r*, the left end of the first internal pipe 104*a*, and the left end of the fifteenth internal pipe 104*q* are positioned below the mating portion 53 of the bottom plate 51 with the cover 52, and pass through to outside the battery case 50 via a seal member 55 disposed at the left side face of the bottom plate 51. The left end of the sixteenth internal pipe 104*r* is connected to the seventh external pipe 103*g*, the left end of the first internal pipe 104*a* is connected to the third external pipe 103*c*, and the left end of the fifteenth internal pipe 104*q* is connected to the sixth external pipe 103*f*. The sixteenth internal pipe 104*r* and the seventh external pipe 103*g*, the first internal pipe 104*a* and the third external pipe 103*c*, and the fifteenth internal pipe 104*q* and the sixth external pipe 103*f*, may each be configured as a single pipe, or may be configured as two pipes connected together.

The connection portion between the sixteenth internal pipe 104*r* and the seventh external pipe 103*g*, the connection portion between the first internal pipe 104*a* and the third external pipe 103*c*, and the connection portion between the fifteenth internal pipe 104*q* and the sixth external pipe 103*f*, are each positioned in the front-rear direction between the bracket fastening portion 63*q* of the second bracket 63B that is a rigid body, and the bracket fastening portion 63*q* of the third bracket 63C, this being a similar rigid body. The ninth external pipe 103*i* (the bypass flow path 105) and the eighth external pipe 103*h* that are connected to the seventh external pipe 103*g* through the first outside-case branched section 112*a*, the first external pipe 103*a* and the second external pipe 103*b* that are connected to the third external pipe 103*c* through the outside-case flow-merging section 113, and a portion of the sixth external pipe 103*f* bending from a connection portion to the left end of the fifteenth internal pipe 104*q*, each extend along the front-rear direction of the vehicle V and are, as illustrated in FIG. 6, disposed so as to be adjacent to each other in the width direction of the vehicle V, between the left side seal 7 and the left side floor frame 8. Note that there is none of the external piping 103 disposed between the right side seal 7 and the right side floor frame 8, enabling, for example, an exhaust pipe of a hybrid vehicle to be disposed therebetween.

Figure 7:
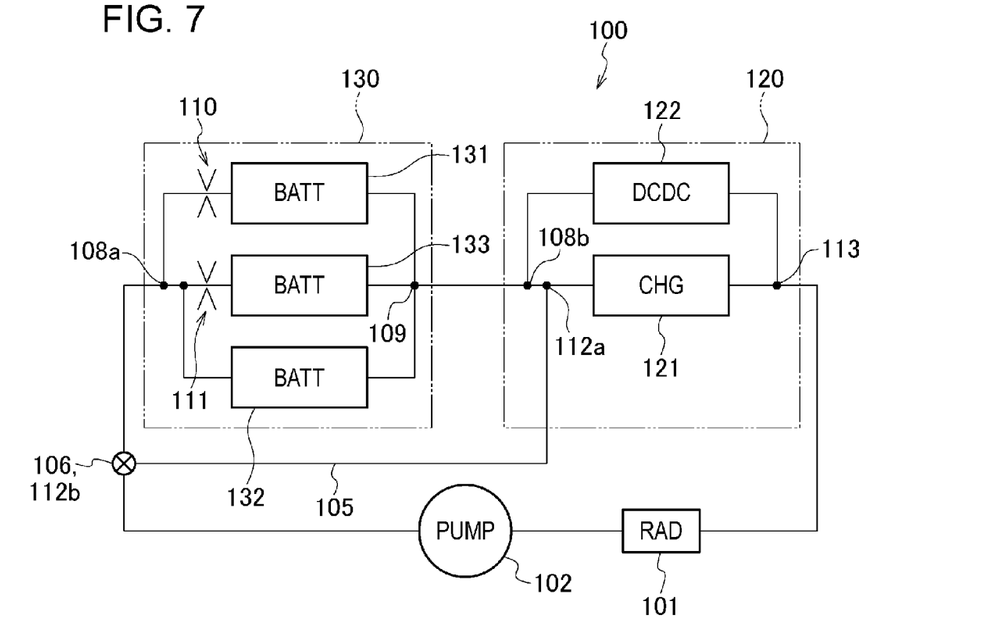
FIG. 7 is a schematic block diagram of the cooling circuit of FIG. 4.

FIG. 7 is a schematic block diagram of the cooling circuit 100 that has just been explained in detail with respect to FIG. 4. The label CHG in the drawings indicates the charger cooler 121, the label DCDC indicates the DC/DC converter cooler 122, and the label BATT indicates the battery module coolers 131 to 133.

As illustrated in FIG. 7, in the cooling circuit 100 of the present embodiment, the radiator 101, the cooling pump 102, the high voltage battery cooler 130, and the high voltage device cooler 120, which is composed of the charger cooler 121 and the DC/DC converter cooler 122, are connected together in series. The high voltage device cooler 120 is disposed at the downstream side of the high voltage battery cooler 130. The upstream side of the high voltage battery cooler 130, and the upstream side of the high voltage device cooler 120 and the downstream side of the high voltage battery cooler 130, are connected together by the bypass flow path 105. The three-way solenoid valve 106 is provided at the branched section (the second outside-case branched section 112*b*) between the bypass flow path 105 and the flow path at the upstream side of the high voltage battery cooler 130. Moreover, the high voltage battery cooler 130 is composed of the three battery module coolers 131 to 133 that are disposed side-by-side in a row, and the high voltage device cooler 120 is composed of the DC/DC converter cooler 122 and the charger cooler 121 also disposed side-by-side in a row.

Cooling Circuit Operation

Figure 8:
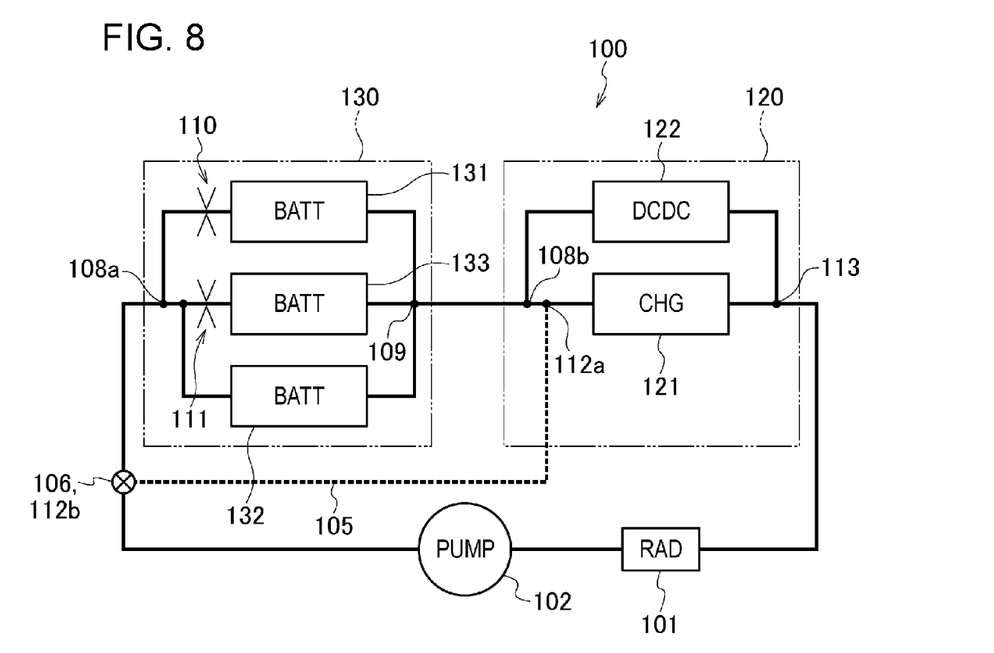
FIG. 8 is a schematic block diagram of a cooling circuit illustrating coolant flow when a solenoid valve is OFF.
Figure 9:
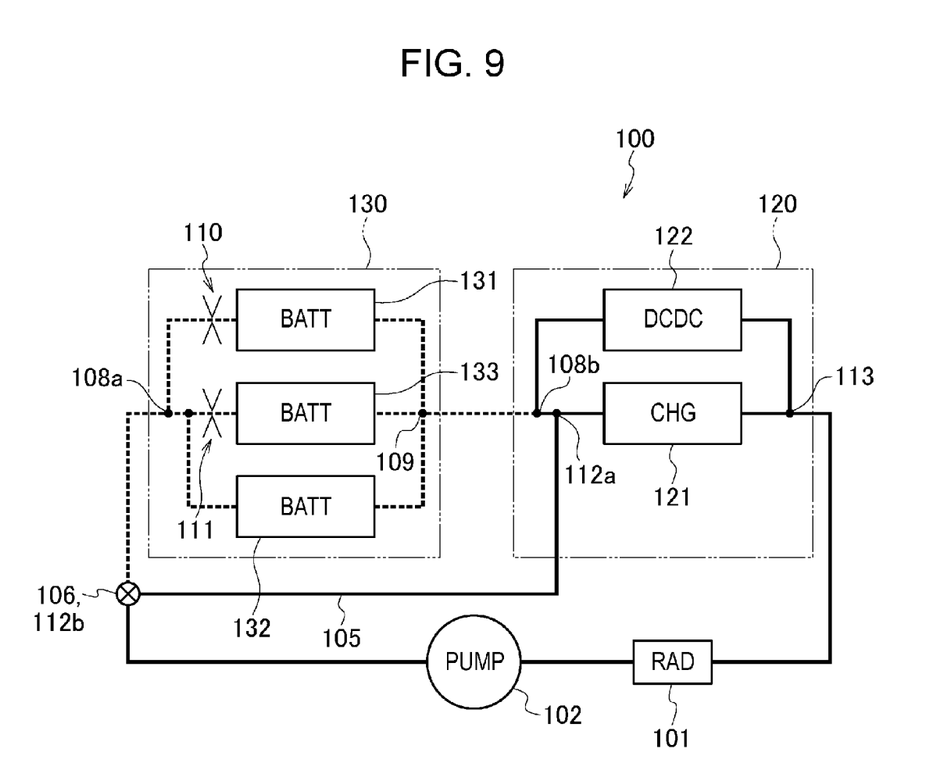

Next, explanation follows regarding operation of the cooling circuit 100, with reference to FIG. 8 and FIG. 9. In FIG. 8 and FIG. 9, flow paths along which coolant is flowing are indicated by solid lines, and flow paths along which coolant is not flowing are indicated by dashed lines.

Three-Way Solenoid Valve OFF

In the cooling circuit 100 configured as described above, upon driving the cooling pump 102, the cooling pump 102 sucks in low temperature coolant from the radiator 101 side, and ejects the coolant toward the high voltage battery cooler 130 side. Due to the three-way solenoid valve 106 being OFF in a normal state, as illustrated in FIG. 8, the coolant ejected from the cooling pump 102 does not flow through the bypass flow path 105, and instead all of the coolant is supplied to the high voltage battery cooler 130.

The coolant supplied to the high voltage battery cooler 130 is first distributed, at the first in-case branched section 108*a*, to the front battery module cooler 131 and to the rear battery module cooler 134. When this is performed, the coolant flow rate toward the front battery module cooler 131 side is limited by the orifice 110, and more of the coolant is supplied to the rear battery module cooler 134 than to the front battery module cooler 131. The coolant supplied to the rear battery module cooler 134 is then further distributed, to the lower rear battery module cooler 132 and to the upper rear battery module cooler 133. When this is performed, the coolant flow rate toward the upper rear battery module cooler 133 side is limited by the orifice 111, and more of the coolant is supplied to the lower rear battery module cooler 132 than to the upper rear battery module cooler 133.

The coolant that has passed through the three battery module coolers 131 to 133 is then, after merging in the in-case flow-merging section 109, distributed through the second in-case branched section 108*b* to the DC/DC converter cooler 122 and to the charger cooler 121. The coolant that has passed through the DC/DC converter cooler 122 and the charger cooler 121 is then, after merging in the outside-case flow-merging section 113, returned to the radiator 101 where it is cooled.

Three-Way Solenoid Valve ON

In the cooling circuit 100, when there is no need to cool the high voltage batteries 31*a* to 33*a*, or when coolant temperature is not appropriate for the required temperature of the high voltage batteries 31*a* to 33*a*, but cooling of the DC/DC converter 22 and the charger 21 is required, as illustrated in FIG. 9, coolant supply to the high voltage battery cooler 130 may be shut off, and the DC/DC converter 22 and the charger 21 cooled alone, by controlling to switch the three-way solenoid valve 106 ON. Namely, when the three-way solenoid valve 106 is switched ON, the coolant being ejected from the cooling pump 102 does not flow to the high voltage battery cooler 130, and instead all of the coolant is supplied to the bypass flow path 105. The coolant supplied to the bypass flow path 105 bypasses the high voltage battery cooler 130, and is distributed through the first outside-case branched section 112*a* and the second in-case branched section 108*b* to the DC/DC converter cooler 122 and the charger cooler 121. Coolant that that has flowed through the DC/DC converter cooler 122 and the charger cooler 121 then, after merging in the outside-case flow-merging section 113, returns to the radiator 101, where it is cooled.

As described above, in the vehicle power unit 1 according to the present embodiment, the first in-case branched section 108*a* that divides coolant between the front battery module cooler 131 and the rear battery module cooler 134, and the fifteenth internal pipe 104*q*, are provided on the internal piping 104 between the front battery module 31 and the rear battery module 34. One end of the fifteenth internal pipe 104*q* is connected to the first in-case branched section 108*a*, and the other end of the fifteenth internal pipe 104*q* configures a flow path that passes through to outside the battery case 50 through the left side of the battery case 50, which is one side in the vehicle width direction. This thereby enables the paths from the first in-case branched section 108*a* to the front battery module cooler 131 and the rear battery module cooler 134 to be shortened. At the one side of the battery case 50, the fifteenth internal pipe 104*q* is connected to the sixth external pipe 103*f* at the outside of the battery case 50, thereby increasing the sealing performance during traveling in comparison to cases in which the fifteenth internal pipe 104*q* is connected at the outside of the battery case 50 at the front of the battery case 50. Pipe assembly operation may also be performed at the side of the vehicle V, resulting in an easy assembly operation.

Moreover, in the cooling circuit 100, due to the front battery module cooler 131 and the rear battery module cooler 134 being connected together in parallel through the first in-case branched section 108*a*, the pressure loss may be decreased compared to cases in which connection is in series, enabling the ejection power of the cooling pump 102 to be suppressed.

The sixteenth internal pipe 104*r* for discharging coolant, which had merged in the in-case flow-merging section 109 after flowing through the front battery module cooler 131 and the rear battery module cooler 134, to outside of the battery case 50 through the left side of the battery case 50 is provided so as to be adjacent to the fifteenth internal pipe 104*q*. Hence the fifteenth internal pipe 104*q* and the sixteenth internal pipe 104*r* may be grouped together at a single location, thereby increasing the ease of operation for assembly of the internal piping 104.

The DC/DC converter 22 is provided between the front battery module 31 and the lower rear battery module 32. The thirteenth internal pipe 104*n* that supplies coolant to the DC/DC converter 22 and the first internal pipe 104*a* that discharges coolant that cooled the DC/DC converter 22 to outside the battery case 50 through the left side of the battery case 50, are disposed at the downstream side of the in-case flow-merging section 109, between the first in-case branched section 108*a* and the in-case flow-merging section 109, and so as to be adjacent to the fifteenth internal pipe 104*q*. This accordingly facilitates layout of piping to the DC/DC converter 22. The ease of assembly operation may also be increased due to grouping the internal piping 104 together.

Moreover, the high voltage battery cooler 130 is disposed at the upstream side of the DC/DC converter cooler 122, such that even in a situation in which both the battery modules 31 to 33 and the DC/DC converter 22 are being cooled, the battery modules 31 to 33 having a low control temperature (inferior heat resistance) may be cooled with certainty, without being affected by the temperature of the DC/DC converter 22. Moreover, the plural battery module coolers 131 to 133 are connected together in parallel, enabling temperature a difference between the battery modules 31 to 33 to be suppressed from arising. The cooling pump 102 may also be made more compact and lightweight due to being able to suppress an increase in pressure loss.

Moreover, the fifteenth internal pipe 104*q*, the sixteenth internal pipe 104*r*, and the first internal pipe 104*a* pass through to outside the battery case 50 via the seal member 55 positioned below the mating portion 53 and disposed on the side face of the bottom plate 51. This thereby enables the sealing performance of the battery case 50 with the fifteenth internal pipe 104*q*, the sixteenth internal pipe 104*r*, and the first internal pipe 104*a* to be increased, without impairing the sealing performance of the mating portion 53 of the bottom plate 51 with the cover 52. Due to the fifteenth internal pipe 104*q*, the sixteenth internal pipe 104*r*, and the first internal pipe 104*a* passing through to outside of the battery case 50 in a state grouped together at one location, the ease of operation for piping assembly after installation of the battery case 50 in the vehicle may be improved. The mating portion 53 of the bottom plate 51 with the cover 52 is sealed using the ring shaped seal member 54, thereby increasing the sealing performance of the battery case 50.

Moreover, from out of the external piping 103, the ninth external pipe 103*i* (the bypass flow path 105) and the eighth external pipe 103*h*, the first external pipe 103*a* and the second external pipe 103*b*, and a portion of the sixth external pipe 103*f* bending from a connection portion to the left end of the fifteenth internal pipe 104*q*, are all disposed adjacent to each other in the width direction of the vehicle V, between the left side seal 7 and the left side floor frame 8. This accordingly facilitates layout of piping, and enables the external piping 103 to be protected during a collision.

In the above embodiment, an example has been given in which the battery unit 10 is installed with the DC/DC converter 22 as a high voltage device; however, it is not always necessary for a high voltage device to be installed to the battery unit 10. In such cases, the two pipes connected to the DC/DC converter 22, namely, the first internal pipe 104*a* and the thirteenth internal pipe 104*n*, are not required, and the sixteenth internal pipe 104r and the fifteenth internal pipe 104q are disposed adjacent to each other, and the sixteenth internal pipe 104r and the fifteenth internal pipe 104q pass through to outside of the battery case 50 via the seal member 55 positioned below the mating portion 53 and disposed on the side face of the bottom plate 51.

Technology disclosed in the present application is not limited to the embodiment described above, and appropriate modifications, improvements, and the like may be implemented.

For example, although the above embodiment is configured such that the fifteenth internal pipe 104q, the sixteenth internal pipe 104r, and the first internal pipe 104a pass through to the outside of the battery case 50 through the left side of the vehicle V, they may be configured to pass through to the outside of the battery case 50 through the right side of the vehicle V.

Moreover, although in the above embodiment the bottom plate 51 and three pipes, in other words, the fifteenth internal pipe 104q, the sixteenth internal pipe 104r, and the first internal pipe 104a, are sealed by a single seal member 55, the bottom plate 51 and the respective pipes may be sealed with seal members that are divided one for each pipe.

Moreover, although in the above embodiment an example has been given in which the lower rear battery module 32 and the upper rear battery module 33 serve as the rear battery module, a configuration may be implemented in which either one is provided alone, or in which three or more battery modules are provided.

Moreover, although an example has been given in which the DC/DC converter 22 and the charger 21 serve as the high voltage device, a high voltage device need not necessarily be provided in the vehicle power unit 1. Moreover, another high voltage device may be provided either in place of, or as well as, the DC/DC converter 22 and the charger 21.

Moreover, the cooling circuit 100 of the above embodiment may employ water as the coolant in a water-based cooling circuit, or may employ oil as the coolant in an oil-based cooling circuit.

A first aspect of the present application is a vehicle power unit (for example, a vehicle power unit 1 of an embodiment described below) including a front battery module including plural batteries (for example, a front battery module 31 of the embodiment described below), a rear battery module including plural batteries (for example, a rear battery module 34 of the embodiment described below), a battery case housing the front battery module and the rear battery module (for example, a battery case 50 of the embodiment described below), and a cooling circuit (for example, a cooling circuit 100 of the embodiment described below). The cooling circuit includes a cooling pump (for example, a cooling pump 102 of the embodiment described below), a front battery module cooler (for example, a front battery module cooler 131 of the embodiment described below) that cools the front battery module, and a rear battery module cooler (for example, a rear battery module cooler 134 of the embodiment described below) that cools the rear battery module. The battery case is disposed below a floor panel (for example, a floor panel 3 of the embodiment described below). The cooling circuit includes cooling internal piping (for example, internal piping 104 of the embodiment described below) that is provided inside the battery case, that receives coolant from the cooling pump, and that discharges coolant to outside of the battery case.

The cooling internal piping includes, between the front battery module and the rear battery module, a branched section (for example, a first in-case branched section 108a of the embodiment described below) where the flow of coolant branches to the front battery module cooler and to the rear battery module cooler, and includes a flow path (for example, a fifteenth internal pipe 104q of the embodiment described below) having one end connected to the branched section and another end passing through to outside the battery case through one side of the battery case in a vehicle width direction.

The first aspect of the present application enables the path from the branched section to the front battery module cooler and the rear battery module cooler to be short.

A second aspect of the present application is the vehicle power unit of the first aspect, in which the cooling internal piping includes first cooling internal piping (for example, a fifteenth internal pipe 104q of the embodiment described below) configuring the flow path, and second cooling internal piping (for example, a sixteenth internal pipe 104r of the embodiment described below) that discharges coolant, merged at a flow-merging section (for example, an in-case flow-merging section 109 of the embodiment described below) after passing through the front battery module cooler and the rear battery module cooler, through the one side of the battery case to outside the battery case. The second cooling internal piping is disposed so as to be adjacent to the first cooling internal piping.

The second aspect of the present application enables the ease of operation for cooling internal piping assembly to be increased, by grouping the first cooling internal piping and the second cooling internal piping configuring the cooling internal piping together at a single location.

A third aspect of the present application is the vehicle power unit of the second aspect, in which the battery case includes a bottom plate (for example, a bottom plate 51 of the embodiment described below) on which the batteries are mounted and a cover (for example, a cover 52 of the embodiment described below) that covers the batteries from above. The bottom plate and the cover are sealed at a mating portion (for example, a mating portion 53 of the embodiment described below), and the first cooling internal piping and the second cooling internal piping pass through to outside the battery case via a seal member (for example, a seal member 55 of the embodiment described below) positioned below the mating portion and disposed at a side face of the bottom plate.

The third aspect of the present application enables the ease of operation for battery case assembly to be further increased, by disposing the batteries and the cooling internal piping on the bottom plate. Moreover, by passing the first cooling internal piping and the second cooling internal piping through to outside of the battery case at a side face of the bottom plate, below and separated from the mating portion between the bottom plate and the cover, sealing may be achieved between the battery case, and the first cooling internal piping and the second cooling internal piping, without impairing the sealing performance of the mating portion between the bottom plate and the cover. Moreover, the ease of operation for piping assembly after installation of the battery case in the vehicle may be improved due to passing the first cooling internal piping and the second cooling internal piping through to outside of the battery case in a state of the first cooling internal piping and the second cooling internal piping being grouped together at a single location.

A fourth aspect of the present application is the vehicle power unit of the first or second aspect, in which the cooling circuit includes the cooling internal piping provided inside the battery case and cooling external piping (for example, external piping 103 of the embodiment described below) provided outside the battery case and connected to the cooling pump. The battery case is disposed between a pair of first framework members (for example, floor frames 8 of the embodiment described below) extending along a vehicle front-rear direction. A pair of second framework members (for example, side seals 7 of the embodiment described below) are provided in the vehicle width direction outside of the pair of first framework members and alongside the pair of first framework members. Part of the cooling external piping is disposed on the one side between the first framework member and the second framework member.

The fourth aspect of the present application enables layout of piping to be facilitated and the cooling external piping to be protected in a collision, due to providing the cooling external piping between the first framework member and the second framework member configuring the framework of the vehicle.

A fifth aspect of the present application is the vehicle power unit according to the second aspect. The vehicle power unit further includes a high voltage device (for example, a DC/DC converter 22 of the embodiment described below) provided between the front battery module and the rear battery module. The cooling internal piping further includes third cooling internal piping (for example, a thirteenth internal pipe 104n of the embodiment described below) that is disposed at the downstream side of the flow-merging section and between the branched section and the flow-merging section. The third cooling internal piping supplies coolant to the high voltage device. The cooling internal piping further includes fourth cooling internal piping (for example, a first internal pipe 104a of the embodiment described below) that discharges coolant that has cooled the high voltage device through the one side of the battery case to outside of the battery case. The third cooling internal piping and the fourth cooling internal piping are disposed so as to be adjacent to the first cooling internal piping.

According to the fifth aspect of the present application, the third cooling internal piping and the fourth cooling internal piping which are connected to the high voltage device are disposed at the downstream side of the flow-merging section, between the branched section and the flow-merging section, and adjacent to the first cooling internal piping, so that the layout of piping to the high voltage device is facilitated. The ease of assembly operation may be improved due to grouping of the cooling internal piping together.

A sixth aspect of the present application is the vehicle power unit according to the fifth aspect, in which the battery case includes a bottom plate (for example, a bottom plate 51 of the embodiment described below) on which the batteries are mounted, and a cover (for example, a cover 52 of the embodiment described below) that covers the batteries from above. The bottom plate and the cover are sealed at a mating portion (for example, a mating portion 53 of the embodiment described below). The first cooling internal piping, the second cooling internal piping, and the fourth cooling internal piping pass through to outside the battery case via a seal member (for example, a seal member 55 of the embodiment described below) positioned below the mating portion and disposed at a side face of the bottom plate.

The sixth aspect of the present application enables the ease of operation for battery case assembly to be further improved due to disposing the batteries and the cooling internal piping on the bottom plate. Moreover, due to passing the first cooling internal piping, the second cooling internal piping, and the fourth cooling internal piping through to outside of the battery case at a side face of the bottom plate, below and separated from the mating portion between the bottom plate and the cover, the sealing performance between the battery case, and the first cooling internal piping, the second cooling internal piping, and the fourth cooling internal piping may be improved, without impairing the sealing performance of the mating portion between the bottom plate and the cover. Moreover, the ease of operation for piping assembly after installation of the battery case in the vehicle may be improved due to passing the first cooling internal piping, the second cooling internal piping, and the fourth cooling internal piping through to outside of the battery case in a state of being grouped together at a single location.

A seventh aspect of the present application is the vehicle power unit according to the fourth aspect, in which the cooling external piping is not provided at the other side of the battery case in the vehicle width direction between the first framework member and the second framework member.

The seventh aspect of the present application enables space between the first framework member and the second framework member at the other side of the battery case to be efficiently utilized to dispose another member in the space, due to the cooling external piping being grouped together and disposed at the one side of the battery case.

An eighth aspect of the present application is the vehicle power unit according to the fourth aspect, in which the battery case includes a bottom plate (for example, a bottom plate 51 of the embodiment described below) on which the batteries are mounted and a cover (for example, a cover 52 of the embodiment described below) that covers the batteries from above. The bottom plate includes a tray in a plate shape (for example, a tray 64 of the embodiment described below) and plural cross-direction reinforcement members (for example, brackets 63 of the embodiment described below) provided on a lower face of the tray and extending in the width direction of the vehicle. The battery case is disposed below the floor panel by fastening portions (for example, bracket fastening portions 63q of the embodiment described below) of the cross-direction reinforcement members being fastened to the first framework members. The flow path is positioned as being interposed in the front-rear direction between the fastening portions of the cross-direction reinforcement members and connected to the cooling external piping.

The eighth aspect of the present application enables a connection section, where the flow path and the cooling external piping are connected to the branched section, to be protected during a collision due to disposing the connection section as being interposed in the front-rear direction between the rigid bodies of the fastening portions of the cross-direction reinforcement members.

Obviously, numerous modifications and variations of the present invention are possible in light of the above teachings. It is therefore to be understood that within the scope of the appended claims, the invention may be practiced otherwise than as specifically described herein.

What is claimed is:
1. A vehicle power device comprising:
a front battery module including a plurality of batteries;
a rear battery module including a plurality of batteries;
a battery case housing the front battery module and the rear battery module; and a cooling circuit including a cooling pump, a front battery module cooler that cools the front battery module, and a rear battery module cooler that cools the rear battery module, the battery case being disposed below a floor panel, the cooling circuit including cooling internal piping that is provided inside the battery case, that receives coolant from the cooling pump, and that discharges coolant to outside of the battery case, and the cooling internal piping including, between the front battery module and the rear battery module, a branched section where the flow of coolant branches to the front battery module cooler and to the rear battery module cooler and including a flow path having one end connected to the branched section and another end passing through to outside the battery case through one side of the battery case in a vehicle width direction.

2. The vehicle power device according to claim 1, wherein the cooling internal piping includes first cooling internal piping configuring the flow path, and second cooling internal piping that discharges coolant, merged at a flow-merging section after passing through the front battery module cooler and the rear battery module cooler, through the one side of the battery case to outside the battery case and the second cooling internal piping is disposed so as to be adjacent to the first cooling internal piping.

3. The vehicle power device according to claim 2, wherein the battery case includes a bottom plate on which the batteries are mounted and a cover that covers the batteries from above, the bottom plate and the cover are sealed at a mating portion, and the first cooling internal piping and the second cooling internal piping pass through to outside the battery case via a seal member positioned below the mating portion and disposed at a side face of the bottom plate.

4. The vehicle power device according to claim 2, further comprising a high voltage device provided between the front battery module and the rear battery module, wherein the cooling internal piping further includes
third cooling internal piping that is disposed between the branched section and the flow-merging section at the downstream side of the flow-merging section and supplies coolant to the high voltage device and
fourth cooling internal piping that discharges coolant that has cooled the high voltage device through the one side of the battery case to outside of the battery case and the third cooling internal piping and the fourth cooling internal piping are disposed so as to be adjacent to the first cooling internal piping.

5. The vehicle power device according to claim 4, wherein the battery case includes a bottom plate on which the batteries are mounted and a cover that covers the batteries from above, the bottom plate and the cover are sealed at a mating portion, and the first cooling internal piping, the second cooling internal piping, and the fourth cooling internal piping pass through to outside the battery case via a seal member positioned below the mating portion and disposed at a side face of the bottom plate.

6. The vehicle power device according to claim 1, wherein the cooling circuit includes the cooling internal piping provided inside the battery case and cooling external piping provided outside the battery case and connected to the cooling pump, the battery case is disposed between a pair of first framework members extending along a vehicle front-rear direction, a pair of second framework members are provided in the vehicle width direction outside of the pair of first framework members and alongside the pair of first framework members, and part of the cooling external piping is disposed on the one side between the first framework member and the second framework member.

7. The vehicle power device according to claim 6, wherein the cooling external piping is not provided at the other side of the battery case in the vehicle width direction between the first framework member and the second framework member.

8. The vehicle power device according to claim 6, wherein the battery case includes a bottom plate on which the batteries are mounted and a cover that covers the batteries from above, the bottom plate includes a tray in a plate shape and a plurality of cross-direction reinforcement members provided on a lower face of the tray and extending in the vehicle width direction, the battery case is disposed below the floor panel by fastening portions of the cross-direction reinforcement members being fastened to the first framework members, and the flow path is positioned as being interposed in the front-rear direction between the fastening portions of the cross-direction reinforcement members and connected to the cooling external piping.

9. The vehicle power device according to claim 1, wherein the battery case includes a bottom plate on which the batteries are mounted and a cover that covers the batteries from above, the bottom plate and the cover are sealed at a mating portion, and the another end of the flow path passes through to outside the battery case via a seal member positioned below the mating portion and disposed at a side face of the bottom plate.

10. A vehicle power device comprising:

a front battery module including a plurality of first batteries;

a rear battery module including a plurality of second batteries and arranged at rear of the front battery module in a front-rear direction of a vehicle;

a battery case housing the front battery module and the rear battery module; and a cooling circuit comprising:
a cooling pump;
a front battery module cooler provided at the front battery module to cool the front battery module;
a rear battery module cooler provided at the rear battery module to cool the rear battery module;
cooling internal piping provided inside the battery case, coolant from the cooling pump being to flow to outside of the battery case via the cooling internal piping, the cooling internal piping comprising:
a branched section provided between the front battery module and the rear battery module to branch the flow of the coolant to the front battery module cooler and to the rear battery module cooler; and a flow path having one end connected to the branched section and another end passing through to outside of the battery case through one side of the battery case in a vehicle width direction substantially orthogonal to the front-rear direction.

11. The vehicle power device according to claim 10, wherein the cooling internal piping includes first cooling internal piping configuring the flow path, and second cooling internal piping that discharges the coolant, merged at a flow-merging section after passing through the front battery module cooler and the rear battery module cooler, through the one side of the battery case to outside of the battery case and the second cooling internal piping is disposed so as to be adjacent to the first cooling internal piping.

12. The vehicle power device according to claim 11, wherein the battery case includes a bottom plate on which the first batteries and the second batteries are mounted and a cover that covers the first batteries and the second batteries from above, the bottom plate and the cover are sealed at a mating portion, and the first cooling internal piping and the second cooling internal piping pass through to outside of the battery case via a seal member positioned below the mating portion and disposed at a side face of the bottom plate.

13. The vehicle power device according to claim 11, further comprising a high voltage device provided between the front battery module and the rear battery module, wherein the cooling internal piping further includes
third cooling internal piping that is disposed between the branched section and the flow-merging section at a downstream side of the flow-merging section and supplies the coolant to the high voltage device and
fourth cooling internal piping that discharges the coolant that has cooled the high voltage device through the one side of the battery case to outside of the battery case and the third cooling internal piping and the fourth cooling internal piping are disposed so as to be adjacent to the first cooling internal piping.

14. The vehicle power device according to claim 13, wherein the battery case includes a bottom plate on which the first batteries and the second batteries are mounted and a cover that covers the first batteries and the second batteries from above, the bottom plate and the cover are sealed at a mating portion, and the first cooling internal piping, the second cooling internal piping, and the fourth cooling internal piping pass through to outside of the battery case via a seal member positioned below the mating portion and disposed at a side face of the bottom plate.

15. The vehicle power device according to claim 10, wherein the cooling circuit includes the cooling internal piping provided inside the battery case and cooling external piping provided outside of the battery case and connected to the cooling pump, the battery case is disposed between a pair of first framework members extending along the front-rear direction, a pair of second framework members are provided in the vehicle width direction outside of the pair of first framework members and alongside the pair of first framework members, and part of the cooling external piping is disposed on the one side between the first framework member and the second framework member.

16. The vehicle power device according to claim 15, wherein the cooling external piping is not provided at the other side of the battery case in the vehicle width direction between the first framework member and the second framework member.

17. The vehicle power device according to claim 15, wherein the battery case includes a bottom plate on which the first batteries and the second batteries are mounted and a cover that covers the first batteries and the second batteries from above, the bottom plate includes a tray in a plate shape and a plurality of cross-direction reinforcement members provided on a lower face of the tray and extending in the vehicle width direction, the battery case is disposed below a floor panel by fastening portions of the cross-direction reinforcement members being fastened to the first framework members, and the flow path is positioned as being interposed in the front-rear direction between the fastening portions of the cross-direction reinforcement members and connected to the cooling external piping.

18. The vehicle power device according to claim 10, wherein the battery case is disposed below a floor panel.

19. The vehicle power device according to claim 10, wherein the battery case includes a bottom plate on which the first batteries and the second batteries are mounted and a cover that covers the first batteries and the second batteries from above, the bottom plate and the cover are sealed at a mating portion, and the another end of the flow path passes through to outside of the battery case via a seal member positioned below the mating portion and disposed at a side face of the bottom plate.

* * * * *